(12) United States Patent
Svraka et al.

(10) Patent No.: US 11,905,869 B2
(45) Date of Patent: *Feb. 20, 2024

(54) EXHAUST AFTERTREATMENT SYSTEM

(71) Applicant: VOLVO TRUCK CORPORATION, Gothenburg (SE)

(72) Inventors: Irman Svraka, Tranås (SE); Åsa Högström, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,466

(22) Filed: Dec. 28, 2022

(65) Prior Publication Data
US 2023/0212971 A1 Jul. 6, 2023

(30) Foreign Application Priority Data

Jan. 4, 2022 (EP) ..................................... 22150256

(51) Int. Cl.
*F01N 3/20* (2006.01)
*F01N 13/00* (2010.01)
(Continued)

(52) U.S. Cl.
CPC ....... *F01N 3/2013* (2013.01); *B01D 46/0027* (2013.01); *B01D 53/944* (2013.01);
(Continued)

(58) Field of Classification Search
CPC ...... F01N 3/2013; F01N 3/021; F01N 3/2066; F01N 3/2892; F01N 3/30; F01N 13/009;
(Continued)

(56) References Cited

U.S. PATENT DOCUMENTS 8,978,370 B2 3/2015 Gonze et al.
2013/0291526 A1* 11/2013 Gonze .................. B60W 20/14
60/311
(Continued)

FOREIGN PATENT DOCUMENTS

CN 111963284 A 11/2020
DE 102007047774 A1 4/2009
DE 102016206080 A1 * 10/2017

OTHER PUBLICATIONS

Machine Translation of DE 102016206080 A1 (Year: 2017).*
European Search Report dated Jun. 20, 2022 in corresponding European Patent Application No. 22150256.0, 5 pages.

*Primary Examiner* — Brandon D Lee
(74) *Attorney, Agent, or Firm* — Venable LLP; Jeffri A. Kaminski

(57) ABSTRACT

An exhaust aftertreatment system for an internal combustion engine includes an outer casing having an exhaust gas inlet and an exhaust gas outlet between which a fluid flow path for exhaust gases is provided, a selective catalytic reduction unit provided in the fluid flow path for reducing nitrogen oxides, a reductant dosing device for adding reductant to the exhaust flow upstream of the selective catalytic reduction unit, and a rotatable mixer device for mixing the reductant with exhaust gases upstream of the selective catalytic reduction unit, an air inlet valve provided upstream of the mixer device for introducing air into the fluid flow path, and an electric motor arranged for rotating the mixer device to create a suction of air into the fluid flow path via the air inlet valve.

16 Claims, 2 Drawing Sheets

(51) Int. Cl.
*B01D 46/00* (2022.01)
*B01D 53/94* (2006.01)
*F01N 3/021* (2006.01)
*F01N 3/28* (2006.01)
*F01N 3/30* (2006.01)

(52) U.S. Cl.
CPC ..... *B01D 53/9431* (2013.01); *B01D 53/9477* (2013.01); *F01N 3/021* (2013.01); *F01N 3/2066* (2013.01); *F01N 3/2892* (2013.01); *F01N 3/30* (2013.01); *F01N 13/009* (2014.06); *B01D 2279/30* (2013.01); *F01N 2610/1453* (2013.01)

(58) Field of Classification Search
CPC ........ F01N 2610/1453; B01D 46/0027; B01D 53/9431; B01D 53/944; B01D 53/9477; B01D 2279/30
See application file for complete search history.

(56) References Cited

U.S. PATENT DOCUMENTS

| | | | |
|---|---|---|---|
| 2014/0311126 A1 | 10/2014 | Gandhi et al. | |
| 2016/0230631 A1* | 8/2016 | Mital | F01N 3/2066 |
| 2017/0037799 A1* | 2/2017 | Balenovic | F01N 3/006 |
| 2020/0116061 A1* | 4/2020 | Hupfeld | B60N 2/002 |
| 2020/0392881 A1* | 12/2020 | Takizawa | F01N 3/035 |
| 2023/0059437 A1* | 2/2023 | Yang | F02M 26/15 |

* cited by examiner

EXHAUST AFTERTREATMENT SYSTEM

TECHNICAL FIELD

The invention relates to an exhaust aftertreatment system for an internal combustion engine. It further relates to a method for controlling the exhaust aftertreatment system, an electronic control unit of an exhaust aftertreatment system, and a vehicle.

The invention can be applied in heavy-duty vehicles, such as trucks, buses and construction equipment. Although the invention will be described with respect to a truck, the invention is not restricted to this particular vehicle, but may also be used in other vehicles such as passenger cars and working machines. It may also be applied in vessels and in stationary construction equipment in which combustion engines and exhaust aftertreatment systems are used.

BACKGROUND

Exhaust aftertreatment systems, EATSs, are commonly used in the automotive field to reduce emissions from combustion engines, such as particulate emissions and nitrogen oxide, NOx, emissions. In order to comply with existing and upcoming emission legislations, it is particularly desirable to minimize cold start emissions. Furthermore, EATS robustness and durability are becoming increasingly important to ensure compliance with such emission legislations.

Together with a constant demand for increased fuel economy of the vehicle, the mentioned emission legislations imply a need for a more efficient operation of the EATS. For example, the EATS must heat up fast and have a high conversion efficiency also at very low loads, and at cold start of the engine when the temperature of the exhaust gases is low. The need of very efficient engines for meeting stringent CO2-requirements also leads to lower temperature of the exhaust gases and higher engine out NOx-levels, requiring large amounts of reductant to be injected upstream the Selective Catalytic Reduction, SCR, unit of the EATS. Furthermore, when using urea as the reductant, the urea requires heat to evaporate and hydrolyse into ammonia. If the temperature is low, e.g., during cold start of the engine, there is a large risk for creating crystallization and deposits that reduce the effect of the EATS. A mixer may be used to mix urea and exhaust gases and thereby help to break down urea to ammonia. A urea dosing system hardware therefore typically has a maximum dosing ability, commonly limited by exhaust temperature and mass flow. For example, a certain minimum temperature and exhaust mass flow may be needed to allow urea dosing at all, whereas a higher temperature and an increased exhaust mass flow will generally allow an increased flow of urea from the urea dosing system as long as the temperature is not too high. At too high temperatures, there is a risk of ammonia slip from the SCR unit.

Prior to engine start, the EATS may be preconditioned to reduce the negative effects associated with cold start. In some examples, the preconditioning of the EATS is performed by heating a component or sub-system of the EATS in order to increase the temperature thereof to be closer to its operating temperature prior to operation of the EATS at engine start. Such thermal preconditioning of the EATS requires energy. Moreover, as the EATS constitutes a large thermal buffer of the vehicle comprising thermally interconnected components, thermal preconditioning may be performed with a relatively low accuracy, as the supplied heat is dissipated and transferred to other EATS components than the anticipated.

In view of the above, there is a need for solutions that allow improved temperature control and preconditioning of EATSs to reduce NOx emissions from vehicles, in particular in connection with starting of the vehicle.

SUMMARY

A primary object of the invention is to provide an EATS and a method for controlling the EATS that are in at least some aspect improved with respect to known EATSs and methods. In particular, it is an object to provide an EATS offering improved possibilities for preconditioning and temperature control. Another object is to provide an EATS with improved emission control.

According to a first aspect of the invention, at least the primary object is achieved by an exhaust aftertreatment system (EATS) for an internal combustion engine according to claim 1. The exhaust aftertreatment system comprises:
- an outer casing having an exhaust gas inlet and an exhaust gas outlet between which a fluid flow path for exhaust gases from the internal combustion engine is provided,
- a selective catalytic reduction (SCR) unit provided in the fluid flow path for reducing nitrogen oxides,
- a reductant dosing device for adding reductant to the exhaust flow upstream of the selective catalytic reduction unit, and
- a rotatable mixer device for mixing the reductant with exhaust gases upstream of the selective catalytic reduction unit,
- an air inlet valve provided upstream of the mixer device for introducing air into the fluid flow path, and
- an electric motor arranged for rotating the mixer device to create a suction of air into the fluid flow path via the air inlet valve.

The exhaust aftertreatment system further comprises a heating element configured to heat gaseous medium flowing in the fluid flow path.

By the air inlet valve in the fluid flow path and the electric motor arranged for rotating the mixer device, the mass flow through a portion of the EATS where reductant, such as urea, is decomposed can be significantly increased thanks to the created suction of air. This enhances the decomposition of the reductant into ammonia and carbon dioxide. Thereby, the reductant dosage can be increased, in turn increasing the amount of ammonia, i.e., reducing agent, that can be stored in the SCR unit. The NOx conversion performance of the EATS may thereby be improved.

By furthermore providing a heating element configured to heat gaseous medium flowing in the fluid flow path, preheating of the EATS prior to engine start may be carried out by opening the air inlet valve, rotating the mixer device to induce a mass flow of air through the fluid flow path, and using the heating element to heat the air. The pre-heating leads to better functionality of the EATS components. For example, improved conditions for ammonia storage in the SCR unit at low engine operating temperatures, or in connection with starting of the engine, are achieved. NOx conversion can thereby start earlier during a following combustion process. For example, if a liquid or a solid reductant is injected into the fluid channel, heating thereof typically results in gasification of the liquid or solid reductant. Gaseous reductant, or gaseous ammonia, is more easily transported into the SCR unit by the induced fluid flow and/or the uptake or storage of the ammonia in the SCR unit is also facilitated by a gaseous reductant or gaseous ammonia.

The air inlet valve, the electric motor and the heating element together allow for a more versatile temperature control of the EATS, and in particular of the SCR unit. This may be exploited both for heating, as described above, and, in some cases, for cooling.

As used herein, the terms "upstream" and "downstream" refer to the fluid flow path through the EATS.

The mixer device may be designed as a fan, with one or more blades, preferably at least two blades, fixed to a rotatable hub driven by the electric motor. The mixer device may be provided in a mixing chamber, or mixing pipe, of the EATS.

The air introduced via the air inlet valve is preferably ambient air. In other words, the air inlet valve is arranged to, when open, allow a flow of ambient air from outside of the exhaust aftertreatment system into the fluid flow path.

The SCR unit referred to may be a main SCR unit of the EATS, such as a single SCR unit of the EATS. It is also possible that the SCR unit is a so-called pre-SCR unit, i.e., an additional SCR unit, which is usually smaller than the main SCR unit. Thus, the invention is applicable with one or more SCR units within the EATS. An ammonia slip catalyst (ASC) unit may optionally be provided in connection with the SCR unit. In a common exemplary configuration of the EATS, two parallel assemblies are provided downstream of the mixer device, each assembly comprising an SCR unit followed by an ASC unit.

The heating element may be an electrical heating element configured to be heated by means of electricity. The heating element may be a resistive heating element, or an induction heating element, or a Positive Temperature Coefficient, PTC, based element. The heating element may comprise a heated component positioned in the fluid flow path, such as a lattice, a grating, a coil or a plate.

The heating element may alternatively comprise a burner configured to heat the heated component referred to above.

Preferably, the heating element is provided downstream of the air inlet valve and upstream of the selective catalytic reduction unit. This is particularly beneficial for pre-heating, or preconditioning, of the EATS prior to starting the engine, when there is no exhaust flow from the engine. The position of the heating element within the fluid flow path may further be selected depending on which part of the EATS in intended to be heated. By positioning the heating element upstream of the SCR unit, an efficient heating of the SCR unit is possible.

Optionally, the air inlet valve is configured as a one-way valve. The valve may thus be configured to allow air to flow into the EATS, while no gas flow out from the EATS via the valve is possible.

Optionally, the exhaust aftertreatment system further comprises a particulate filter provided upstream of the reductant dosing device, wherein the air inlet valve and the heating element are positioned upstream of the particulate filter. The particulate filter may be a particulate filter adapted to remove particulate matter and/or soot from the combusted fuel used by the engine. For a diesel-powered combustion engine, the particulate filter is a diesel particulate filter (DPF). By positioning the air inlet valve and the heating element upstream of the particulate filter, it is possible to efficiently pre-heat the particulate filter prior to starting the engine, thereby improving functionality at engine start.

Optionally, the exhaust aftertreatment system further comprises an oxidation catalyst unit provided upstream of the reductant dosing device, wherein the air inlet valve, and optionally the heating element, is/are positioned upstream of the oxidation catalyst unit. The oxidation catalyst unit may, in the case of diesel fuel, be a diesel oxidation catalyst (DOC) unit. With the air inlet valve and the heating element positioned upstream of the oxidation catalyst unit, an efficient pre-heating of the oxidation catalyst unit is achieved. This improves the functionality of the oxidation catalyst unit at engine start.

Optionally, the oxidation catalyst unit is provided upstream of the particulate filter, wherein the air inlet valve, and optionally the heating element, is/are positioned upstream of the oxidation catalyst unit. With the air inlet valve and the heating element positioned upstream of the particulate filter and the oxidation catalyst unit, an efficient pre-heating of both components, is achieved. This improves the functionality of the particulate filter at engine start.

Optionally, the EATS may comprise an additional SCR unit, a so-called pre-SCR unit, positioned upstream of the oxidation catalyst unit. The air inlet valve and the heating element may herein be provided upstream of the pre-SCR unit, so as to achieve efficient pre-heating of the pre-SCR unit.

Optionally, the exhaust aftertreatment system further comprises a particulate filter and/or an oxidation catalyst unit, such as a DOC unit, provided upstream of the reductant dosing device, wherein the air inlet valve, and optionally the heating element, is/are positioned downstream of the particulate filter and/or of the oxidation catalyst unit. This allows selective temperature control of the components downstream of the air inlet valve.

The air inlet valve may be provided in the outer casing, i.e., the air inlet valve defines a selectively openable opening in the outer casing of the EATS. The outer casing is herein a casing, or an assembly of casing units that are sealingly fixed to each other, that delimits the fluid flow path from ambient air. Substrates of the EATS, i.e., a substrate of the SCR unit and of any other components, such as of a particulate filter and/or an oxidation catalyst unit, may be enclosed within an outer casing formed as one piece, or have their own separate casings that are sealingly fixed together to form the outer casing.

Optionally, the heating element is provided upstream of the mixer device. This enables efficient heating of a mixer surface, in turn providing improved conditions for mixing reductant with exhaust and/or air without crystallization or deposit formation. In particular, it is beneficial for the heating element to be provided between the air inlet valve and the rotatable mixer device. This configuration enables efficient heating of the mixer device by inducing an air flow before starting the engine, which air flow is heated using the heating element.

Optionally, the heating element is provided downstream of the air inlet valve and upstream of the particulate filter and/or of the oxidation catalyst unit. By placing the air inlet valve at an inlet of the EATS and the heating element upstream of both the oxidation catalyst unit and the particulate filter, the entire EATS may be pre-heated. By instead placing the inlet valve and the heating element between the oxidation catalyst unit and the particulate filter, the oxidation catalyst unit being upstream of the particulate filter, the oxidation catalyst unit may be exempted from pre-heating.

Optionally, the heating element is provided downstream of the mixer device. In this case, the heating element should preferably be positioned upstream of the SCR unit, i.e., between the mixer device and the SCR unit.

Optionally, the exhaust aftertreatment system further comprises an electronic control unit configured to control at least the air inlet valve, the electric motor, and the heating element. The electronic control unit may also be configured to control the reductant dosing device. The electronic control unit enables an improved control of the amount of air and the temperature within the EATS and may be configured for pre-heating of the EATS prior to engine start. The air inlet valve is controlled by controlling a position of the air inlet valve, also referred to as a state, such as an opening degree of the air inlet valve.

The electronic control unit may be configured to control the air inlet valve, the electric motor, and the heating element to achieve a target temperature The electronic control unit may be configured to control the rotational speed of the electric motor without changing the position of the air inlet valve. For example, if an improved mixing without added air flow is desired, the rotational speed of the electric motor may be increased without opening the air inlet valve.

Optionally, the electronic control unit is configured to precondition the exhaust aftertreatment system prior to engine start by controlling the air inlet valve and the electric motor to create a suction of air into the fluid flow path and by controlling the heating element to heat the air flowing in the fluid flow path. Hereby, the EATS is preconditioned in an advantageous manner, since an increased temperature of the EATS when the engine starts is more beneficial for efficient operation of the EATS. For example, the reductant dosing device can thereby inject reductant earlier, meaning that the SCR unit can start to convert NOx faster due to the eliminated warm-up process that otherwise occurs following engine start. Typically, NOx emissions related to cold-start emissions are reduced as the SCR unit is preconditioned prior to engine start. The cold-start emissions typically comprise undesired compounds such as NOx, particles, carbon monoxide (CO), or unburned HC, in the exhaust as a result of a cold-start of the engine. By preconditioning the EATS as described in the present disclosure, such cold-start emissions can be reduced. Thus, cold-start emissions can be reduced, and emission reduced exhaust gases can leave the EATS through a tailpipe. Typically, the engine is provided in a vehicle, and the emission reduced exhaust gases can thus leave the EATS trough the tailpipe of the vehicle.

Optionally, the electronic control device is configured to precondition the exhaust aftertreatment system to reach a predetermined temperature.

Optionally, the electronic control unit is configured to control the reductant dosing device to inject the reductant into the fluid flow path during preconditioning, wherein the electronic control unit may be configured to precondition the EATS to reach a predetermined level of ammonia storage in the SCR unit. The SCR unit can thereby be brought closer to its normal operating condition prior to engine start. The predetermined level of ammonia storage may e.g. be an ammonia storage threshold level. The electronic control unit may herein be configured to start injection of reductant once a predetermined threshold temperature threshold within the EATS has been reached. For example, a threshold temperature of 180° C. may be used, but the actual level will depend on, e.g., the type of fuel used, and where in the EATS the temperature is measured. The electronic control unit may further be configured to start injection of reductant only on condition that a mass flow within the fluid flow path is above a threshold level.

Optionally, the electronic control unit may be configured to initiate preconditioning up to 30 minutes prior to a planned engine start, such as between 1-30 minutes, or 1-20 minutes, or 1-10 minutes, before engine start. The actual time needed for preconditioning depends on, e.g., the mass flow of air and the temperature of the heating element.

A temperature sensor may be provided within the EATS for measuring the temperature of the exhaust gases or of one of the components of the EATS. The mass flow of exhaust gases from the internal combustion engine may typically be determined in e.g., an engine control unit based on engine operating conditions, although it is also possible to use a mass flow sensor to determine the mass flow. An engine operating condition is herein to be understood as an operating condition of the engine that affects the exhaust from the engine, e.g., exhaust gas temperature, exhaust gas flow, and exhaust gas composition. The engine operating condition may, e.g., be defined by one or more of an engine speed, an engine load, one or more fuel injection parameters, a fuel type, a fuel mixture, a fuel-to-air mixture, ambient conditions etc.

The electronic control unit may herein be configured to receive data from one or more temperature sensors of the EATS, from an engine control unit, from a mass flow sensor of the EATS, and/or from the reductant dosing device.

Optionally, the electronic control unit may be configured to control the air inlet valve to an open position only when the electric motor is running, at least when the engine is running. This ensures that exhaust gases cannot escape from the outer casing of the EATS via the air inlet valve, thanks to the pressure difference caused by the motor driven mixer device. During preconditioning, before the engine has been started, the electronic control unit may preferably be configured to control the air inlet valve to an open position simultaneously with starting the electric motor, or even before starting the electric motor.

Optionally, the air inlet valve is gradually controllable between a closed position and a fully open position. This enables a precise mass flow control. In other configurations, the air inlet valve may be configured as a two-position valve settable to one open and one closed position.

Optionally, the reductant dosing device is configured to inject a liquid reductant for providing ammonia to the SCR unit. Thus, preconditioning of the EATS prior to engine start may, in addition to pre-heating, comprise injecting the liquid reductant into the fluid flow path. Hereby, a conventional type of reductant source may easily be injected into the fluid flow path, the liquid reductant being e.g. urea. According to at least one example embodiment, the liquid reductant is anhydrous ammonia, aqueous ammonia, aqueous urea or a diesel exhaust fluid comprising ammonia.

Optionally, the reductant dosing device is configured to inject a gaseous reductant for providing ammonia to the SCR unit. Thus, preconditioning of the EATS prior to engine start may, in addition to pre-heating, comprise injecting the gaseous reductant into the fluid flow path. Hereby, transportation of the reductant to the SCR unit is facilitated. Uptake or storage of the ammonia in the SCR unit is also facilitated by using a gaseous reductant and/or less external heat is needed in order to provide the SCR catalyst with reductant in the form of a gas.

According to at least one example embodiment, the reductant dosing device is configured to inject a solid reductant for providing ammonia to the SCR unit. Thus, preconditioning of the EATS prior to engine start may, in addition to pre-heating, comprise injecting the solid reductant into the fluid channel. Typically, such solid reductant, e.g., in the form of solid crystal elements, must be heated in order for providing ammonia which the SCR unit can store.

According to a second aspect of the invention, a vehicle comprising an internal combustion engine and the exhaust aftertreatment system according to the first aspect is provided. The combustion engine is adapted for the combustion of fuel, such as diesel, petrol, hydrogen, gaseous fuels, etc.

According to a third aspect of the invention, a method for preconditioning at least a part of an exhaust aftertreatment system for an internal combustion engine according to the first aspect is provided. The method comprises the steps of:
controlling the air inlet valve to allow air into the fluid flow path,
controlling the rotatable mixer device to create a suction of air into the fluid flow path,
controlling the heating element to heat the air flowing in the fluid flow path.

By controlling the rotatable mixer device, i.e., the rotational speed of the electric motor, the air inlet valve, and the heating element, an efficient heating of at least parts of the EATS can be achieved prior to starting the engine, thereby reducing negative effects due to cold start emissions.

Advantageously, the method may further comprise:
controlling the reductant dosing device to inject a reductant into the fluid flow path.

This step may be performed on condition that a predetermined threshold temperature threshold has been reached, and that a mass flow within the fluid flow path is above a threshold level.

According to a fourth aspect of the invention, an electronic control unit for controlling an exhaust aftertreatment system is provided, wherein the electronic control unit is configured to instruct the exhaust aftertreatment system according to the first aspect to perform the steps of the method according to the third aspect.

The electronic control unit may form part of a control system of the EATS, such as a computerized control system. Such a control system may include one or more control unit(s), such as one or more electronic control units. The control system may comprise at least one communication interface for receiving data communicated from other units within the vehicle, such as from various sensors, systems and control units, in particular from an engine control unit and from sensor(s) within the EATS. The control system may be configured to communicate wirelessly or via a hardwire system. The electronic control unit may also be provided separately from the EATS, such as in another control system or forming part of another electronic control unit of the vehicle. The electronic control unit is in this case configured to communicate with the various sensors and devices of the EATS, such as with the reductant dosing device, the temperature sensor(s), the air inlet valve, and the electric motor, either directly or via an EATS control unit.

According to a fifth aspect, a computer program comprising program code means for causing the exhaust aftertreatment system according to the first aspect to perform the method steps according to the third aspect when the program is run on a computer is provided. The computer may, e.g., be a computing unit of the electronic control unit according to the fourth aspect. Furthermore, a computer readable medium carrying a computer program comprising program code means for causing the exhaust aftertreatment system according to the first aspect to perform the method steps according to the third aspect when the program is run on a computer may be provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
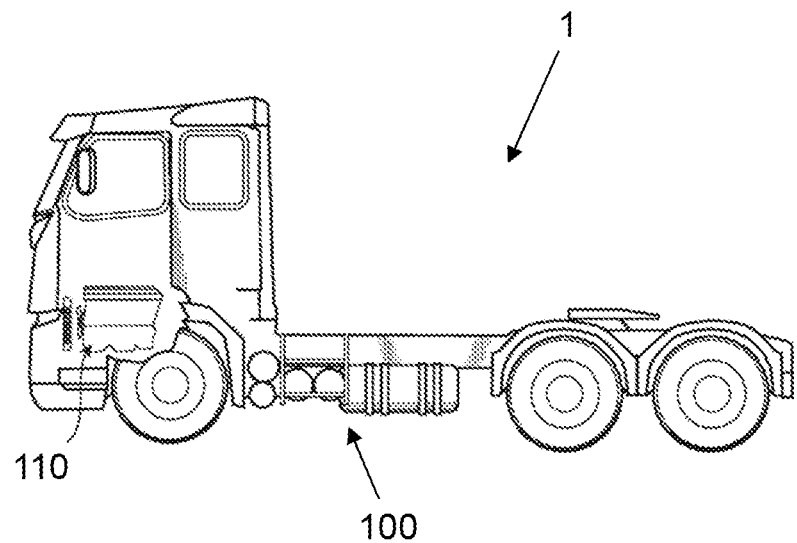
FIG. 1 is a schematic side view of a vehicle.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 1 in the form of a truck is schematically shown in FIG. 1. The vehicle 1 includes an internal combustion engine 110 for propulsion of the vehicle 1, and an exhaust system including an exhaust aftertreatment system (EATS) 100 for guiding and handling exhaust gases generated by the internal combustion engine 110.

Figure 2:
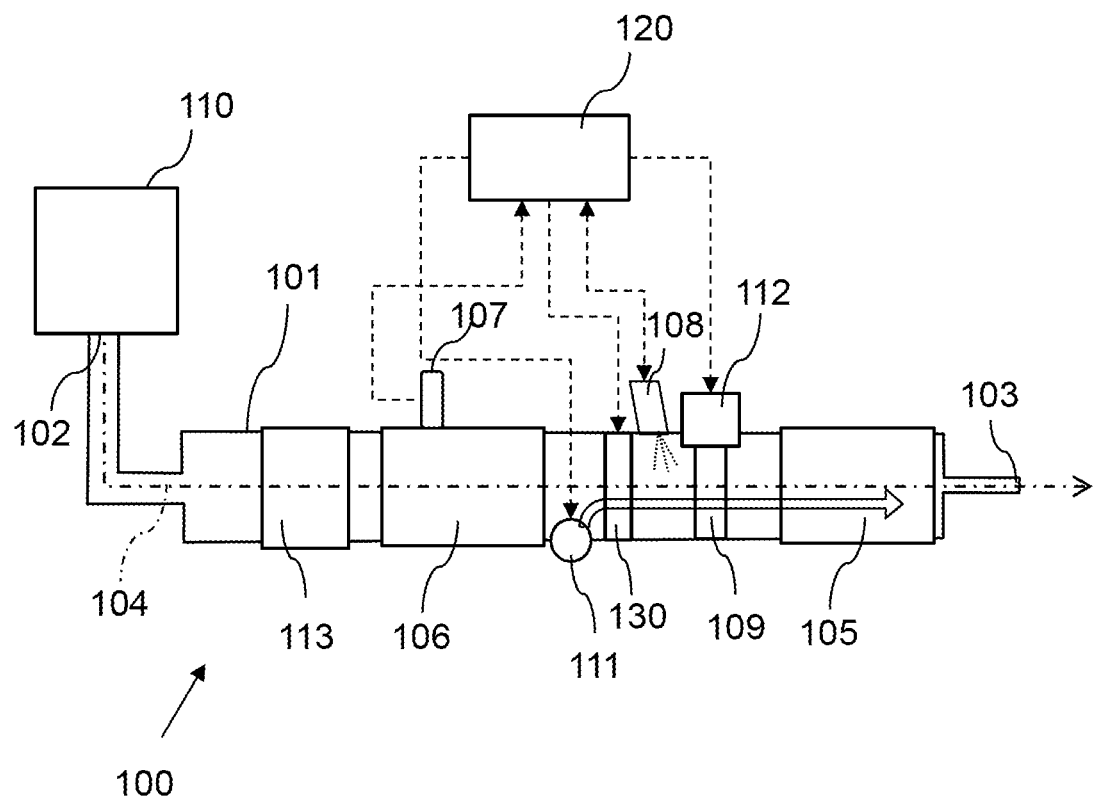
FIG. 2 is a schematic view of an exhaust aftertreatment system according to a first embodiment of the present disclosure.

An exhaust aftertreatment system 100 according to a first embodiment, which may be applied in the vehicle 1, is schematically illustrated in FIG. 2, showing the EATS 100 during operation of the vehicle 1. An outer casing 101 delimits a fluid flow path 104 of the exhaust system 100, extending from an internal combustion engine 110, via an exhaust gas inlet 102 into the exhaust EATS 100, and out of the EATS 100 via an exhaust gas outlet 103. The EATS 100 in the shown embodiment comprises three components 105, 106, 113 for treatment of exhaust gases along the fluid flow path 104. In the shown embodiment, the components 105, 106, 113 are a Selective Catalytic Reduction (SCR) unit 105, a particulate filter 106, such as a Diesel Particulate Filter (DPF) unit 106, and an oxidation catalyst unit 113, such as a Diesel Oxidation catalyst (DOC) unit 113, respectively. The SCR unit 105 is located furthest downstream, the particulate filter 106 is located upstream of the SCR unit 105, and the oxidation catalyst unit 113 is located upstream of the particulate filter 106.

The EATS 100 further comprises a reductant dosing device 108 for adding reductant, such as urea, to the exhaust flow upstream of the SCR unit 105, and a rotatable mixer device 109 for mixing the reductant added by the reductant dosing device 108 with exhaust gases upstream of the SCR unit 105. Both the reductant dosing device 108 and the rotatable mixer device 109 are located between the particulate filter 106 and the SCR unit 105, so that the reductant is added and mixed with the exhaust gases immediately upstream of the SCR unit 105.

The amount of reductant added by the reductant dosing device 108 is typically regulated to achieve a desired buffer of reducing agent, such as ammonia ($NH_3$), in the SCR unit 105. A buffer target level for reducing agent is set and the amount of reductant to be added to achieve the buffer target level is set in dependence on exhaust mass flow from the engine 110 and the SCR unit temperature, in turn dependent on engine operating temperature. Models may be used to determine the amount of reductant to be dosed to achieve the buffer target level for the current operating conditions in terms of SCR unit temperature and exhaust mass flow.

During initial operation of vehicle 1, e.g., up to a point in time at which the operating temperature of the engine 110 and the EATS 100 have been reached, the emissions (e.g. emissions per travelled distance, or emissions per unit operational time) out of the EATS 100 are typically higher compared to when the operating temperature of the engine 110 and the EATS 100 have been reached. Such emissions are referred to as cold-start emissions and they typically comprise undesired compounds, such as NOx, particles, and CO or unburned HC, in the exhaust out from the EATS 100 as a result of the cold-start of the engine 110. In order to avoid, or at least reduce, such cold-start emissions, the EATS 100 may be preconditioned prior to engine start. That is, at least a part of the EATS 100 may be prepared in such a way that the emissions during the initial operation of the engine 110 is reduced.

An openable and closable air inlet valve 111 is at least for this purpose provided upstream of the mixer device 109. The air inlet valve 111 enables introduction of air into the fluid flow path 104 as illustrated by an arrow in FIG. 2. An electric motor 112 is also provided, which electric motor 112 is arranged for rotating the mixer device 109 to create a suction of air into the fluid flow path 104 via the air inlet valve 111. The rotatable mixer device 109 may be designed as a fan, wherein the electric motor 112 is arranged to rotate a rotatable hub of the mixer device 109 to create a suction force.

A heating element 130 configured to heat gaseous medium, such as exhaust gases and/or air, flowing in the fluid flow path 104, is also provided, at least for the purpose of achieving preconditioning of at least a part of the EATS 100. The heating element 130 may be positioned anywhere between the air inlet valve 111 and the SCR unit 105 along the fluid flow path 104. In the embodiment illustrated in FIG. 2, it is positioned downstream of the air inlet valve 111 and upstream of the reductant dosing device 108 and the mixer device 109. The heating element 130 comprises a heated part located in the fluid flow path 104, such as a lattice, a grating, a coil or a plate. The heating element 130 may e.g. be an electrical heating element such as a resistive heating element, or an induction heating element, or a Positive Temperature Coefficient, PTC, based element. It may also comprise a burner configured to heat the heated part.

The EATS 100 further comprises an electronic control unit 120 configured to control the air inlet valve 111, the electric motor 112, and the heating element 130. Herein, the electronic control unit 120 is also configured to control the reductant dosing device 108.

Furthermore, one or more temperature sensors, herein illustrated as a single temperature sensor 107, is/are provided. The temperature sensor 107 is in the illustrated embodiment arranged to measure the temperature of the particulate filter 106, but may alternatively be arranged to measure the temperature of the exhaust gases, or of another component of the EATS 100, such as of the SCR unit 105.

The electronic control unit 120 may be configured to control a position of the air inlet valve 111, i.e. an opening degree thereof, a temperature of the heating element 130, and a rotational speed of the electric motor 112, in particular during preconditioning of the EATS 100 prior to engine start. It may further be configured to control the reductant dosing device 108 to inject reductant into the fluid flow path 104, once a predetermined threshold temperature, e.g., as determined by the temperature sensor 107 or by another temperature sensor within the EATS 100, is achieved. Optionally, a threshold level for the mass flow of air may be set, below which no reductant injection will be initiated. The reductant dosing device 108 may thus be configured to communicate with the electronic control unit 120. The electronic control unit 120 may further be configured to communicate with e.g. an engine control unit (not shown). The temperature sensor 107 is also arranged to communicate with the electronic control unit 120 and provide temperature measurement data thereto.

During operation of the engine 110, the air inlet valve 111 and the electric motor 112 may be controlled by means of the electronic control unit 120 to increase the mass flow through the mixer device 109 and/or to lower the temperature within the SCR unit 105. The electronic control unit 120 may be configured so that, at least when the engine 110 is running, it controls the air inlet valve 111 to an open position only when the electric motor 112 has been started, so that escape of exhaust gases through the air inlet valve 111 is prevented.

Prior to starting the engine 110, and during a start-up phase of the engine 110, it may instead be of interest to instead increase the temperature of at least the mixer device 109 and of the SCR unit 105 to improve the conditions for storing reducing agent within the SCR unit 105. For this purpose, the heating element may be started, heating the air flow from the air inlet valve 111.

The electronic control unit 120 may be configured to precondition the exhaust aftertreatment system 100 prior to engine start by controlling the air inlet valve 111 and the electric motor 112 to create a suction of air into the fluid flow path 104, and by controlling the heating element 130 to heat the air flowing in the fluid flow path 104, and thereby heat the components of the EATS 100 being provided between the heating element 130 and the exhaust gas outlet 103. The preconditioning may be performed so as to reach a predetermined temperature level of the components within the EATS 100. The predetermined temperature level may be set to, e.g., a value of 180° C., or higher.

During preconditioning, once the temperature has reached the predetermined temperature level, the reductant dosing device 108 may be controlled to inject reductant into the fluid flow path 104, given that a mass flow of air through the EATS 100 is sufficient.

Figure 3:
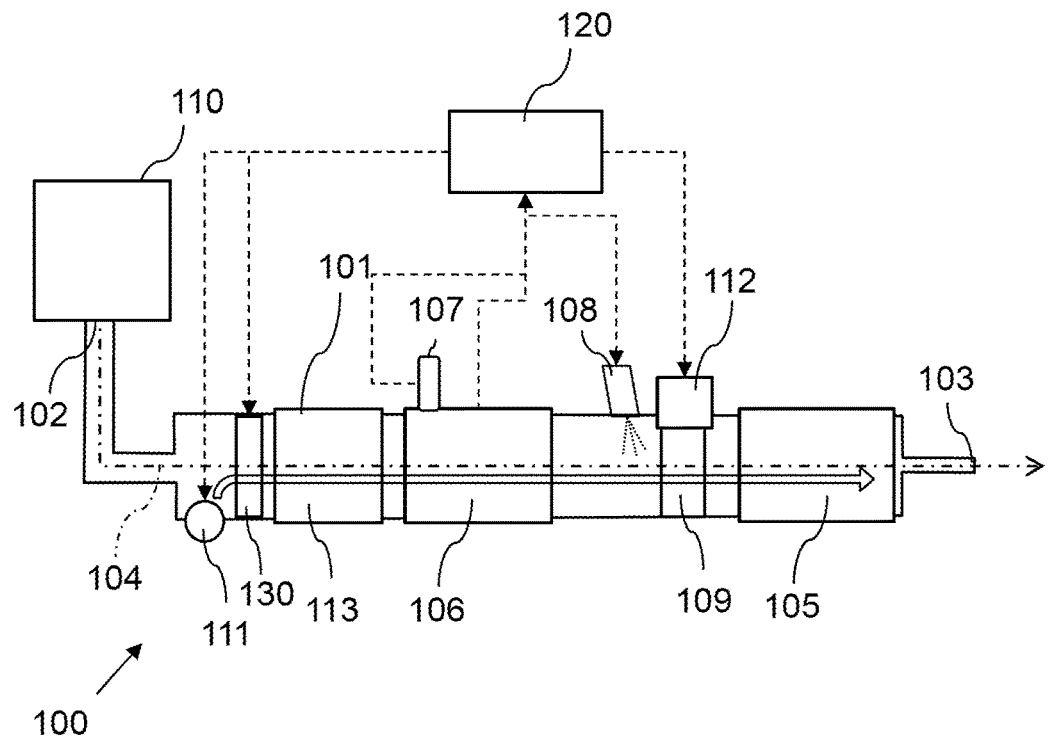
FIG. 3 is a schematic view of an alternative exhaust aftertreatment system according to a second embodiment.

An exhaust aftertreatment system 100 according to a second embodiment is schematically illustrated in FIG. 3. The EATS 100 according to this embodiment differs from the first embodiment in that the air inlet valve 111 is provided upstream of the oxidation catalyst unit 113, and in that the heating element 130 is provided immediately downstream of the air inlet valve 111, i.e., upstream of the oxidation catalyst unit 113.

A mass flow of air created by starting the electric motor 112 and opening the air inlet valve 111 may in this embodiment be heated by the heating element 130 before it passes the oxidation catalyst unit 113, the particulate filter 106, as well as the mixer device 109 and the SCR unit 105. This means that the temperature of not only the SCR unit 105, but also of the oxidation catalyst unit 113 and the particulate filter 106, may be increased prior to starting the engine 110. If the heating element 130 is turned off, the SCR unit 105, the oxidation catalyst unit 113 and the particulate filter 106 may instead be cooled by the mass flow during operation of the engine 110.

The heating element 130 may alternatively be positioned anywhere between the air inlet valve 111 and the SCR unit 105.

In an alternative embodiment, not illustrated, the air inlet valve 111 may be arranged between the oxidation catalyst unit 113 and the particulate filter 106 in the fluid flow path 104. The heating element 130 may also in this embodiment be positioned anywhere between the air inlet valve 111 and the SCR unit 105 along the fluid flow path 104.

Figure 4:
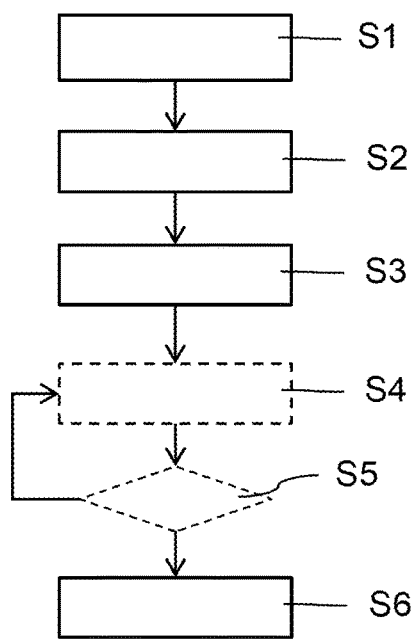
FIG. 4 is a flow chart illustrating a method according to the present disclosure.

A method for preconditioning at least a part of an EATS, such as the EATS 100 according to any one of the illustrated embodiments, is illustrated in FIG. 4. The method may be initiated when the engine 110 is turned off, and hence no exhaust gases are flowing through the EATS. The step S1 may, e.g., be performed at a time up to 30 minutes prior to engine start. The method may be performed by the control unit 120.

In a step S1, the air inlet valve 111 is controlled to allow air into the fluid flow path 104, such as by controlling a position of the air inlet valve 111, i.e. an opening degree thereof.

In a step S2, the rotatable mixer device 109 is controlled to create a suction of air into the fluid flow path 104 via the air inlet valve 111. This may be performed by controlling the rotational speed of the electric motor 112 to induce an air flow through at least part of the EATS 100. The air flow will follow the fluid flow path 104 from the air inlet valve 111 to the exhaust gas outlet 103, passing through at least the mixer device 109 and the SCR unit 105. Since this is performed while the engine 110 is turned off, no exhaust gases are at this point flowing through the EATS 100. It is to be noted that the steps S1 and S2 may be carried out simultaneously, or in any preferred order. Since no exhaust gases are present in the EATS during preconditioning, the air inlet valve 111 may be opened without risking leakage of exhaust gases.

In a step S3, the heating element 130 is controlled to heat the air flowing in the fluid flow path 104. The heated air flow will in turn heat up the EATS components positioned between the heating element 130 and the exhaust gas outlet 103. In the embodiment illustrated in FIG. 2, the rotatable mixer device 109 and the SCR unit 105 are heated by the air flow. In the embodiment illustrated in FIG. 3, the oxidation catalyst unit 113, the particulate filter unit 106, the rotatable mixer device 109 and the SCR unit are all heated by the heated air flow. The heating element 113 may heat the air to a temperature of, e.g., 180-350° C., so that a suitable operational temperature of the components within the EATS 100 is achieved. The step S3 may preferably be carried out after or simultaneously with steps S1 and S2 to protect the heating element 130 from overheating. However, the steps S1, S2 and S3 may be carried out in any preferred order.

In an optional step S4, the reductant dosing device 108 is controlled to inject reductant into the fluid flow path 104, i.e., into the induced air flow. This step may only be initiated subsequently to the steps S1-S3, such as once a predetermined threshold temperature has been reached and given that the mass flow of air is above a threshold level set to prevent crystallization. When the reductant dosing device 108 is provided downstream of the heating element 130, the heated air will thus heat up the injected reductant as it enters the rotatable mixer device 109. Heated reducing agent, such as ammonia, will be stored in the SCR unit 105. Although initiated subsequently to the steps S1, S2 and S3, the step S4 is advantageously carried out while those steps are still being performed, such that injected reductant is at once transported into the mixer device 109 by the induced heated air flow.

In an optional step S5, it is determined whether a predetermined level of reducing agent storage in the SCR unit 105 is reached. In response to determining that the predetermined level of reducing agent storage in the SCR unit 105 has been reached, the preconditioning is stopped in a step S6. However, in response to determining that the predetermined level of ammonia storage in the SCR catalyst has not been reached, the preconditioning restarts by returning to step S4 of injecting reductant into the fluid flow path 104.

The step S6 of stopping the preconditioning may be effected once the engine 110 is started.

By the method described with reference to FIG. 4, the EATS is preconditioned at least with regards to an increased temperature of the SCR unit 105, and optionally with regards to an increased ammonia storage in the SCR unit 105. The method thereby contributes to improving the conversion of NOx emissions in the exhaust gases subsequent to engine start.

Although not illustrated, the EATS 100 disclosed herein may comprise several temperature sensors for measuring temperature at different locations within the EATS 100. Different temperature thresholds may be defined depending on which temperature sensor is used to measure the temperature.

The electric motor 112 may be powered by a battery, such as a rechargeable battery.

The air inlet valve 111 may preferably be a gradually controllable valve, i.e., a valve with an adjustable variable orifice. By way of example only, the gradually controllable valve may be a flap valve, a check valve, or a plug valve, but any suitable valve may be used.

The EATS may comprise more than one SCR unit, wherein a reductant dosing device may be provided for each one of the SCR units. Alternatively, a common reductant dosing device may be provided, the common reductant dosing device being adapted to inject reductant for use by two or more parallel SCR units. In this case, a common rotatable mixer device may also be provided. If more than one SCR unit and more than one reductant dosing device are provided, a rotatable mixer device driven by an electric motor may be provided upstream each one of the SCR units, respectively. For example, in an EATS comprising two SCR units, such as a main SCR unit as described above and a pre-SCR unit positioned upstream of an oxidation catalyst unit, two rotatable mixer devices and two separate electric motors may be provided, optionally also two air inlet valves positioned upstream and downstream of the pre-SCR unit, respectively. Furthermore, in some embodiments, the air inlet valve, the rotatable mixer device and the electric motor may only be provided at the pre-SCR unit. The EATS may further comprise one or more ammonia slip catalyst (ASC) units provided in connection with, and downstream of, the SCR unit(s).

The EATS may also comprise more than one heating element, such as two or three heating elements, depending on, e.g., the number of SCR units. For example, the EATS may comprise one heating element provided upstream of a DOC unit and/or one heating element provided downstream of a particulate filter unit and/or one heating element provided upstream of a pre-SCR unit. A single rotatable mixer device will typically be sufficient, even when multiple heating elements are provided.

The electronic control unit 120 may include a microprocessor, a microcontroller, a programmable digital signal processor or another programmable device. Thus, the electronic control unit 120 comprises electronic circuits and connections (not shown) as well as processing circuitry (not shown) such that the electronic control unit 120 can communicate with different parts of the vehicle 1 or with different control units of the vehicle 1, such as with various sensors, systems and control units, in particular with one or more engine control units (not shown) of the vehicle 100.

The electronic control unit 120 may comprise modules in either hardware or software, or partially in hardware or software, and communicate using known transmission buses such a CAN-bus and/or wireless communication capabilities. The processing circuitry may be a general-purpose processor or a specific processor. The electronic control unit 120 may comprise a non-transitory memory for storing computer program code and data. Thus, the skilled person realizes that the electronic control unit 120 may be embodied by many different constructions. Although herein illustrated as a single unit, the electronic control unit 120 may be formed of several different control units configured to communicate with each other, such as separate control units for controlling the reductant dosing device 108 and for controlling the electric motor 112, the heating element 130, and the air inlet valve 111.

It is to be understood that the present invention is not limited to the embodiments described above and illustrated in the drawings; rather, the skilled person will recognize that many changes and modifications may be made within the scope of the appended claims.

The invention claimed is:

1. An exhaust aftertreatment system for an internal combustion engine, the exhaust aftertreatment system comprising:
   an outer casing having an exhaust gas inlet and an exhaust gas outlet, a fluid flow path for exhaust gases from the internal combustion engine being provided between the exhaust gas inlet and the exhaust gas outlet,
   a selective catalytic reduction unit provided in the fluid flow path and being configured for reducing nitrogen oxides,
   a reductant dosing device for adding reductant to the exhaust flow upstream of the selective catalytic reduction unit, and
   a rotatable mixer device for mixing the reductant with exhaust gases upstream of the selective catalytic reduction unit,
   an air inlet valve provided upstream of the mixer device and being configured for introducing air into the fluid flow path, and
   an electric motor arranged for rotating the mixer device to create a suction of the air introduced into the fluid flow path via the air inlet valve,
wherein
the exhaust aftertreatment system further comprises a heating element configured to heat gaseous medium flowing in the fluid flow path.

2. The exhaust aftertreatment system according to claim 1, wherein the heating element is provided downstream of the air inlet valve and upstream of the selective catalytic reduction unit.

3. The exhaust aftertreatment system according to claim 1, wherein the air inlet valve is configured as a one-way valve.

4. The exhaust aftertreatment system according to claim 1, further comprising a particulate filter provided upstream of the reductant dosing device, wherein the air inlet valve and the heating element are positioned upstream of the particulate filter.

5. The exhaust aftertreatment system according to claim 4, further comprising an oxidation catalyst unit provided upstream of the particulate filter, wherein the air inlet valve and the heating element are positioned upstream of the oxidation catalyst unit.

6. The exhaust aftertreatment system according to claim 1, further comprising a particulate filter and/or an oxidation catalyst unit provided upstream of the reductant dosing device, wherein the air inlet valve is positioned downstream of the particulate filter and/or of the oxidation catalyst unit.

7. The exhaust aftertreatment system according to claim 1, wherein the heating element is provided upstream of the mixer device.

8. The exhaust aftertreatment system according to claim 5, wherein the heating element is provided downstream of the air inlet valve and upstream of the particulate filter and/or of the oxidation catalyst unit.

9. The exhaust aftertreatment system according to claim 1, wherein the heating element is provided downstream of the mixer device.

10. The exhaust aftertreatment system according to claim 1, wherein the air inlet valve is provided in the outer casing.

11. The exhaust aftertreatment system according to claim 1, further comprising an electronic control unit configured to control at least the air inlet valve, the electric motor, and the heating element.

12. The exhaust aftertreatment system according to claim 11, wherein the electronic control unit is configured to precondition the exhaust aftertreatment system prior to engine start by controlling the air inlet valve and the electric motor to create the suction of air into the fluid flow path and by controlling the heating element to heat the air flowing in the fluid flow path.

13. A vehicle comprising an internal combustion engine and the exhaust aftertreatment system according to claim 1.

14. A method for preconditioning at least a part of an exhaust aftertreatment system of claim 1 for an internal combustion engine, the method comprising:
   controlling the air inlet valve to allow air into the fluid flow path,
   controlling the rotatable mixer device to create a suction of the air allowed into the fluid flow path,
   controlling the heating element to heat the air flowing in the fluid flow path.

15. An electronic control unit for controlling an exhaust aftertreatment system, wherein the electronic control unit is configured to instruct the exhaust aftertreatment system of claim 1.

16. A non-transitory computer readable medium storing program code comprising instructions to cause an exhaust aftertreatment system to execute the steps of the method of claim 14 when the program code is run on a computer.

* * * * *